United States Patent
Recchia et al.

[15] 3,676,497
[45] July 11, 1972

[54] PROCESS FOR PREPARING DI(AMINOPHENYL)-METHANES

[72] Inventors: Frank P. Recchia, New Haven; Henri Ulrich, North Branford, both of Conn.

[73] Assignee: The Upjohn Company, Kalamazoo, Mich.

[22] Filed: Aug. 6, 1968

[21] Appl. No.: 750,454

[52] U.S. Cl. .............. 260/570 D, 260/2.5 AT, 260/453 AM, 260/566 R, 260/570.5 P
[51] Int. Cl. .......................................................... C07c 85/08
[58] Field of Search ........................... 260/570, 453 R, 570 D

[56] References Cited

UNITED STATES PATENTS

| | | | |
|---|---|---|---|
| 2,015,039 | 9/1935 | Pevere | 260/570 |
| 2,683,730 | 7/1954 | Seeger et al. | 260/453 |
| 2,818,433 | 12/1957 | Erickson | 260/570 |
| 2,950,263 | 8/1960 | Abbotson et al. | 260/2.5 |
| 3,260,751 | 7/1966 | Powers et al. | 260/570 |
| 3,277,173 | 10/1966 | Powers et al. | 260/570 |
| 3,297,759 | 1/1967 | Curtiss et al. | 260/570 |
| 3,362,979 | 1/1968 | Bentley | 260/570 X |
| 3,476,806 | 11/1969 | Wolf | 260/570 |
| 3,499,009 | 3/1970 | Odinsk et al. | 260/570 |

OTHER PUBLICATIONS

Allied Chemical, "Avilive," page 35 (1965).

Primary Examiner—Robert V. Hines
Attorney—Eugene O. Retter and Denis A. Firth

[57] ABSTRACT

Di(aminophenyl)methane having a high proportion of the o,p'-isomer (10 to 60 percent) and a substantial proportion of the o,o'-isomer (5 to 25 percent) is obtained by reacting at least 3.5 moles of aniline with 1 mole of formaldehyde, separating the water of condensation from the resulting mixture of aniline and anilino-acetal, heating the anhydrous mixture to 125° C. to 205° C. and adding a proton source (aniline hydrochloride preferred). The mixture of di(aminophenyl)-methane isomers can be separated from the mixture of polyamines so obtained and phosgenated to give a mixture of the corresponding isomeric di(isocyanatophenyl)methanes which mixture is a storage stable liquid. Alternatively the mixture of polyamines can be phosgenated, without separation of the di(aminophenyl)-methane, to give the corresponding mixture of polymethylene polyphenyl polyisocyanates. The latter mixture gives polyurethane foams of much lighter color than those obtained using comparable mixtures produced by prior art procedures.

10 Claims, No Drawings

PROCESS FOR PREPARING DI(AMINOPHENYL)-METHANES

BACKGROUND OF THE INVENTION

1. Field of the Invention

This invention relates to di(aminophenyl)methanes having substantial o,p'-isomer and o,o'-isomer content, to a process for the preparation thereof, and to the corresponding isocyanates produced from said di(aminophenyl)methanes and from mixtures of methylene bridged polyphenyl polyamines containing said di(aminophenyl)methanes.

2. Description of the Prior Art

The preparation of di(aminophenyl)methane, and mixtures of methylene-bridged polyphenyl polyamines containing said diamine, by acid condensation of aniline and formaldehyde, is well-known in the art; see, for example, U.S. Pat. No. 2,638,730. This reaction has become of considerable commercial importance. The diamine itself, and mixtures of polymethylene polyamines containing the diamine as the principal ingredient (which mixtures are the product of the aniline-formaldehyde condensation), are useful as such in the polymer art as curing agents for epoxy resins and for elastomeric polyurethanes. Said diamine and the mixed polyamines containing it are also useful as intermediates in the preparation, by phosgenation, of the corresponding di- and polyisocyanates.

The diisocyanate so obtained is widely used in the preparation of elastomeric polyurethanes while the polymethylene polyphenyl polyisocyanates obtained in the above manner, are widely used in the preparation of polyurethane foams.

The di(aminophenyl)methanes prepared by acid condensation of aniline and formaldehyde in accordance with procedures commonly used hitherto are found to consist mainly (90 percent by weight or greater) of the p,p0'-isomer and to contain only minor amounts (less than 10 percent by weight) of the corresponding o,p'-isomer. Said products contain no substantial amounts of the other theoretically possible isomer, namely the o,o'-isomer. It is found that the di(isocyanato-phenyl)methanes prepared from such diamines are solids of low melting point (circa 40° C.) and, accordingly, have to be melted and maintained molten in order to be dispensed through conventional mixing machines employed in the commercial preparation of polyurethanes. A number of ways of converting such di(isocyanato-phenyl)methanes to storage stable liquids have been adopted; see, for example, U.S. Pat. No. 3,384,653.

Recently there have been described methods for preparing di(aminophenyl)methanes which contain substantially higher proportions of o,p'-isomer to p,p'-isomer and it has been found that such mixtures give rise, upon phosgenation, to corresponding mixtures of di(isocyanato-phenyl)methanes which are liquid at ambient temperatures and hence possess marked advantages over the low melting solid di(isocyanato-phenyl)methane hitherto available. Illustratively, U.S. Pat. No. 3,362,979 describes the preparation of a liquid form of di(isocyanatophenyl)methane containing from 20 to 95 percent by weight of the 2,4'-isomer, the remainder of said mixture being 4,4'-isomer. Said diisocyanate is obtained by phosgenation of the corresponding isomeric mixture of di(aminophenyl)methanes which latter mixture is obtained by condensation of aniline and formaldehyde in the presence of an acidic siliceous catalyst. In the condensation formaldehyde is added to a mixture of aniline and catalyst at a temperature of 100° C. to 300° C. and water is continuously removed from the reaction mixture.

In U.S. Pat. No. 3,277,173 there is described a method of obtaining di(aminophenyl)methane containing a substantial proportion of the 2,4'-isomer by carrying out the Lewis acid catalyzed reaction of aniline and formaldehyde in the presence of a carefully controlled amount of water (including the water of condensation).

Belgian Pat. No. 648,787 described the preparation of di(aminophenyl)methane containing substantial proportions of o,o'-isomer and o,p'-isomer in addition to p,p'-isomer by employing high final reaction temperatures in the hydrochloric acid-catalyzed condensation of aniline and formaldehyde.

We have now found that di(aminophenyl)methanes in which the proportions of o,o'-isomer and o,p'-isomer are substantial, can be prepared using a novel procedure which is possessed of marked economic advantages

SUMMARY OF THE INVENTION

This invention comprises a process for the preparation of di(aminophenyl)methane in which the proportion of o,p'-isomer and o,o'-isomer is substantial said process comprising:

mixing aniline and formaldehyde in proportions such that the aniline is present in an amount corresponding to at least about 3.5 moles per mole of formaldehyde;

removing the water of condensation liberated in the aniline-formaldehyde reaction product;

heating the resulting anhydrous product to a temperature of about 125° C. to about 205° C.; and adding thereto a catalytic amount of a proton source.

The invention also comprises the di(aminophenyl)methanes so produced either in purefied form or as part of a mixture of methylene-bridged polyphenyl polyamines obtained in accordance with the process of the invention. The invention also comprises the di(isocyanato-phenyl)methanes and polymethylene polyphenyl polyisocyanates obtained by phosgenation of said diamine and polyamine mixtures.

DETAILED DESCRIPTION OF THE INVENTION

In the first step of the process of the invention aniline and formaldehyde are brought together in the absence of acid or any other catalyst hitherto employed in the art. The reaction is conducted substantially in accordance with the procedure described by Cohn, Zeitschrift fur Ang. Chem. XIV, 1901, 311. Thus the aniline and formaldehyde are brought together in any convenient manner, advantageously with stirring. The aniline can be added to the formaldehyde or vice versa. However, it is preferred to add the formaldehyde to the aniline. The formaldehyde is preferably in the form of an aqueous solution, i.e., in the form of the 37 percent aqueous solution which is the form most readily available commercially. However, the formaldehyde can also be used in one of its polymerized forms i.e. as paraformaldehyde or trioxymethylene, if desired. The temperature at which the reactants are brought together is not critical. For the sake of convenience the reactants are generally brought together at ambient temperatures (circa 20° to 25° C.) but higher or lower temperatures can be employed if desired. The reaction is exothermic but can be readily controlled either by appropriately adjusting the rate of addition of reactant or by applying external cooling, if necessary. Although, as indicated previously, the reaction temperature in this stage of the reaction is not critical it is preferable that the temperature of the reaction mixture does not rise above about 90° C. during this phase of the reaction. Since water is eliminated in this reaction and the reaction temperature cannot rise above the boiling point of the aqueous mixture, there is an automatic upper limit imposed on the temperature at which the reaction in this first stage occurs.

The reaction taking place between the aniline and formaldehyde in this phase of the reaction is rather complex but the simplest reaction occurring can be represented by the following equation:

(1)

i.e., equimolar proportions in aniline and formaldehyde condense with the elimination of a molecule of water and the formation of the compound (I) which is variously known as "anhydroformaldehydeaniline" (see Cohn, supra) and as the anilinoacetal of formaldehyde.

As will be appreciated by one skilled in the art, the anilino acetal (I) can undergo further condensation. Illustratively the following reaction involving a second molecule of aniline can occur:

(I)

The latter material can undergo reaction with a further molecule of aniline and of formaldehyde in accordance with the following equation:

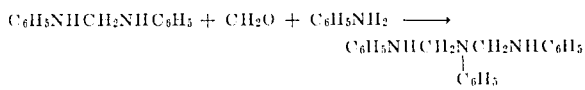

The product so obtained can undergo further similar condensation with formaldehyde and aniline to give more complex molecules. All of the reaction products so obtained can be described generically as anilinoacetals of formaldehyde and will be so designated hereinafter.

Since, as indicated above, an excess of at least 3.5 moles, per mole of formaldehyde, of aniline is always employed in the process of the invention the reaction product obtained in the first step of said process is a mixture of (a) the above mixture of the anilinoacetals of formaldehyde and (b) excess aniline.

It has been found that the use of smaller proportions of aniline to formaldehyde than the minimum set forth above leads to the formation of significant amounts of undesirable by-products in the process of the invention. Chief of said by-products are the N-methyl substituted derivatives of the desired end products.

While the lower limit of the molar proportion of aniline to formaldehyde employed in the first stage of the reaction is dictated by the desire to avoid the production of unrequired by-products, the upper limit is not critical and is dictated largely by economic considerations.

Generally speaking the proportion of aniline to formaldehyde employed in the first step of the process of the invention determines the proportion of di(aminophenyl)methane to higher polymethylene polyphenyl amines in the end-product. Thus, within limits, the higher the molar proportion of aniline to formaldehyde in the first step of the process of the invention the higher the proportion of di(aminophenyl)methane in the eventual reaction product. However, no significant increase in proportion of di(aminophenyl)methane in the reaction product is observed when the molar proportion of aniline to formaldehyde is increased above about 8:1. Accordingly, the latter represents the practical upper limit of said proportions although, obviously, higher proportions can be employed without derogating from the overall results achieved in the process of the invention.

The reaction between the aniline and formaldehyde in the first step of the process of the invention occurs very rapidly even at ambient temperatures. The progress of the reaction can be followed by conventional analytical techniques e.g., by following the disappearance of formaldehyde from the reaction mixture, or by following the amount of water liberated in the condensation, etc. When the reaction is observed to have proceeded to completion the next stage of the process of the invention is initiated.

In the second stage of the process of the invention, the water of condensation eliminated in the first stage of the process is separated from the reaction mixture. Since the water separates as a distinct layer in the reaction mixture, the separation can be carried out simply by siphoning off or decanting the organic layer from the aqueous layer. However, in order to render the reaction mixture anhydrous the last traces of water have to be removed from the organic layer by distillation or like techniques. Accordingly, it is generally most convenient to carry out the separation of the organic and aqueous layers by simple distillation, long tube evaporation, and like methods, if desired, under reduced pressure.

The anhydrous mixture of anilinoacetals so obtained is then submitted to the third stage of the process of the invention. In this stage the anhydrous mixture is heated to a temperature which is within the range of about 125° to 205° C. and preferably within the range of about 150° to 195° C. Advantageously, the time taken to heat the reaction mixture to the selected temperature is short i.e., is less than about one hour. Preferably the time taken to accomplish the heating of the reaction mixture is less than 15 minutes. Similarly, after the reaction mixture has been brought to the desired temperature, the time taken to complete the third stage of the process of the invention is short. Prolonged heating of the reaction product at this stage can result in undesirable by-products due to other than the desired rearrangement of some of the anilinoacetals in said reaction mixture. Accordingly, the total time taken in heating the reaction mixture to the desired temperature and in holding the reaction mixture at said temperature is preferably less than one hour and most preferably is less than 30 minutes.

When the anhydrous reaction mixture from the second stage of the process of the invention has been brought to a temperature within the above range, a catalytic amount of a proton source is added to the reaction mixture. By catalytic amount is meant an amount less than 1 molar equivalent of catalyst per mole of reactant in the reaction mixture being treated. Advantageously, the amount of proton source added is less than 0.2 molar equivalents per mole of reactant and preferably is from about 0.01 molar equivalents to about 0.03 molar equivalents, per mole of reactant.

The term "proton source" is used in its conventionally accepted sense as indicating a material which will generate a proton. Thus, said term is inclusive of inorganic and organic acids which dissociate, at least in part, with the formation of a proton. Said term is also inclusive of addition salts of the aforesaid acids with ammonia and primary, secondary or tertiary amines, which salts dissociate, at the reaction temperature employed in the third stage of the process of the invention, and release the free acid as a proton source. Illustrative of said inorganic and organic acid proton sources are inorganic acids such as hydrochloric acid, hydrobromic acid, hydriodic acid, hydrofluoric acid, sulfuric acid, phosphoric acid, silicic acid, fluosilicic acid, phosphomolybdic acid, and the like; and organic acids particularly hydrocarbon carboxylic acids from one to 12 carbon atoms, inclusive, such as alkanoic acids, for example, formic, acetic, butyric, caproic, caprylic, and lauric acids, alkane dicarboxylic acids, for example, oxalic, malonic, succinic, glutaric, adipic, and sebacic acids, alkenoic acids, for example, acrylic, crotonic, and the like, aromatic carboxylic acids, for example, benzoic, toluic, phthalic, isophthalic, terephthalic, α-naphthoic, β-naphthoic, and the like, and araliphatic carboxylic acids such as phenylacetic, phenylpropionic, α-naphthaleneacetic acid, phenylvaleric acid, and the like.

The above inorganic and organic acids can be used in the free acid as the proton source in the third stage of the process of the invention or can be employed in the form of addition salts with ammonia or primary, secondary, and tertiary alkylamines such as methylamine, dimethylamine, trimethylamine, ethylamine, triethylamine, methylethylamine, methyldiethylamine, butylamine, isobutylamine, hexylamine, N-methylhexylamine, octylamine, N-ethyloctylamine, N,N-diethyloctylamine, and the like; primary, secondary, and tertiary alkenylamines such as allylamine, crotonylamine, methallylamine, 2-hexenylamine, 3-octenylamine, diallylamine, N-methylallylamine, N-methyl-N-ethyl-allylamine, and the like; primary, secondary and tertiary cycloalkylamines such as cyclobutylamine, cyclopentylamine, cyclohexylamine, cyclooctylamine, N-methylcyclohexylamine, N,N-dimethylcyclohexylamine, and the like; primary, secondary, and tertiary cycloalkenylamines such as cyclopentenylamines, cyclohexenylamine, cycloheptenylamine, cyclooctenylamine, N-ethylcyclohexenylamine, N,N-diethylcyclohexenylamine, and the like; primary, secondary, and tertiary aralkylamines such as benzylamine, benzhydrylamine, 2-phenethylamine, 3-phenylpropylamine, N-methylbenzylamine, N-methyl-N-ethylbenzylamine, N,N-diisopropylbenzylamine, and the like;

primary, secondary, and tertiary aromatic amines such as aniline, o-, m-, and p-toluidine, m-xylidine, p-xylidine, m-phenylenediamine, p-phenylenediamine, α-naphthylamine, β-naphthylamine, N-methylaniline, N-methyl-N-isopropylaniline, N,N-dimethylaniline, N,N-diethylaniline, N-methyl-o-toluidine, and the like; and heterocyclic secondary and tertiary amines such as pyridine, pyrrolidine, N-methylpyrrolidine, 2-methyl-pyrrolidine, piperidine, N-ethylpiperdine, piperazine, N-methylpiperazine, N,N'-dimethylpiperazine, morpholine, 2-methyl-morpholine, N-methylmorpholine, N-ethylmorpholine, quinoline, and the like.

In addition to the various free acids and acid addition salts set forth above another source of protons are the complexes of acrylonitrile with hydrogen halides such as the hydrogen chloride complexes; see, for example, U.S. Pat. No. 2,411,064. Such complexes release hydrogen halide at the reaction temperatures called for in the third step of the process of the invention.

While any of the acids described and exemplified above can be employed, either in the form of the free acid or in the form of an addition salt, in the third step of the process of the invention, we prefer to use a hydrogen halide either in the form of the free acid or in the form of an aromatic amine salt. The most preferred proton source for use in the process of the invention is a hydrogen halide addition salt of aniline of which aniline hydrochloride is the ultimate preferred choice. The use of aniline hydrochloride has the advantage not only of liberating hydrogen halide but of employing the same aromatic amine as that which is already present in the reaction mixture. Hence the use of this salt as the proton source avoids the introduction of extraneous molecules which cannot enter into the main reaction which is occuring in the process of the invention.

In carrying out the third step of the process of the invention, the proton source can be introduced into the anhydrous reaction mixture (after heating to the desired temperature within the range hereinbefore given) in any convenient manner and either in one batch or in portions over a period of time. Advantageously, the addition is made while the reaction mixture is being subjected to vigorous agitation.

This step of the process of the invention is readily adapted to operation on a continuous basis. Thus, in one such continuous operation the reaction product from the second stage is passed through a heat exchanger to bring it to the desired reaction temperature and then through a reaction zone in which it is maintained under conditions of turbulent flow while addition of the proton source is made. The resulting mixture is then removed from the reaction zone and worked up as described below.

The time taken for the reaction to proceed to completion, after the addition of the proton source has been accomplished in the third stage of the process of the invention, varies according to the reaction temperature employed. Generally speaking, the time in question is very short and varies from less than 1 minute to about 30 minutes. The progress and completion of the reaction can be followed using conventional analytical procedures such as infrared spectroscopy, ultraviolet spectroscopy, and the like. When the reaction in the third step of the process of the invention is found to have reached completion, the reaction product is cooled, or allowed to cool, to room temperature and then treated to isolate the desired product using procedures conventionally employed in the art for the working up of polyamine mixtures derived from the aniline formaldehyde condensation. For example, the reaction mixture is neutralized, if desired, by the addition of sodium hydroxide, potassium hydroxide and like bases. It is to be noted that, when the amount of proton source employed in the third step of the process of the invention is very small, it is generally not necessary to employ a neutralization step in the working up of the reaction product. This represents an additional advantage in the novel process of the invention.

After neutralization, if such is necessary, the reaction product is distilled to remove excess aniline which may be present. The residue so obtained is a mixture of methylene-bridged polyphenyl polyamines containing di(aminophenyl)-methane as the principal product. This mixture can be used as such for a variety of purposes including the preparation, by phosgenation, of polymethylene polyphenyl polyisocyanates which can be used to obtain polyurethane foams having markedly better color properties than heretofore. Alternatively, the polyamines can be treated, as by fractional distillation, chromatography, and the like, to recover the diamine therefrom. The latter is also useful in the preparation of the corresponding di(isocyanato-phenyl)methane which, in contrast to the diisocyanate containing high proportions of 4,4'-isomer, has the advantage of being a stable liquid product at all normal working temperatures (15° to 25° C.). Indeed, we have obtained in this manner mixtures of isomeric diisocyanates which have a freezing point as low as −40° C. and which have shown no separation of solids on standing at ambient temperatures (20° to 25° C.) for many months.

As previously mentioned the di(aminophenyl)methane obtained in accordance with the process of the invention, whether in the form of the isolated diamine or of the mixture of methylene-bridged polyphenyl polyamines, contains a substantial proportion of the o,p'-isomer and a somewhat smaller but significant proportion of the o,o'-isomer. Indeed, under certain conditions it is possible to obtain mixtures in which the o,p'-isomer is the predominant component of the mixture.

The proportions of the p,p'-isomer, o,p'-isomer and o,o'-isomer in the di(aminophenyl)methane obtained by the process of the invention can vary within the range of about 15 percent to about 85 percent by weight of p,p'-isomer, about 10 percent to about 60 percent by weight of o,p'-isomer, and about 5 percent to about 25 percent by weight of o,o'-isomer. The isomer proportion obtained in any given case is a function of the temperature at which the reaction is conducted in the third step of the process of the invention. In general the proportion of o,p'-isomer and of o,o'-isomer increases, and the proportion of p,p'-isomer correspondingly decreases, as the reaction temperature increases within the range set forth above. The requisite reaction temperature to obtain any given isomer proportion can be determined readily by a simple process of trial and error.

The mixture of methylene-bridged polyphenyl polyamines containing di(aminophenyl)methane which is produced in accordance with the invention differs from corresponding mixtures obtained using procedures hitherto known in the art not only by reason of the differences in proportions of the various isomeric di(aminophenyl)methanes but also by reason of significant differences in proportions of the trimers, tetramers, and higher polymeric components. That this is so is readily apparent from a comparison of the gel permeation chromatographic spectra of representative polyamine mixtures prepared in accordance with the invention and in accordance with the prior art. Not only is the proportion of total trimers to total tetramers, total tetramers to total pentamers, etc. different but the distribution of the various possible individual trimers, tetramers etc. in the products is markedly different.

It is believed that this difference in the proportions of the various polymeric materials in the polyamine mixtures produced in accordance with the invention is one factor which may be responsible for the unexpected and advantageous difference in properties between the polymethylene polyphenyl polyisocyanates produced by phsogenation of the polyamine mixtures obtained in accordance with the present invention and the corresponding polyisocyanates produced from prior art polyamine mixtures.

The following examples describe the manner and process of making and using the invention and set forth the best mode contemplated by the inventors of carrying out the invention but are not to be construed as limiting.

EXAMPLE 1

A total of 8.14 g. (0.1 mole) of 36.9 percent w/w formaldehyde solution was added slowly with stirring over a period of 45 minutes to 74.5 g. (0.8 mole) of aniline. The temperature of the reaction mixture rose from an initial value of 25° C. to a maximum of 32° C. When the addition was complete the mixture was stirred for 2 hours at approximately 25° C. At the end of this period the mixture was heated to 190° C. over a period of 15 minutes with removal of water by distillation using a side arm take-off head. To the resulting hot mixture was added, all at once, 3.11 g. (0.024 mole) of aniline hydrochloride. The temperature of the mixture increased rapidly to 192° C. and was maintained in the range of 190° to 192° C. for 5 minutes after the addition of the aniline hydrochloride. The mixture so obtained was then cooled immediately to 25° C. using an ice water bath and made alkaline by the addition of 20 ml of 50 percent aqueous sodium hydroxide solution. The product was steam distilled to remove excess aniline and the organic layer in the undistilled residue was extracted with methylene chloride. The methylene chloride extract was washed with water until the washings were neutral to litmus. The washed extract was dried over anhydrous magnesium sulfate, filtered, and the filtrate was evaporated to dryness. There was thus obtained 17 g. (85.8 percent theoretical yield based on formaldehyde) of a mixture of methylene-bridged polyphenyl polyamines which was found by gel permeation chromatography (G.P.C.) and gas liquid phase chromatography (G.L.P.C.) (using internal standards based on synthetic mixtures of pure materials) to contain 78.0 percent by weight of di(aminophenyl)methane of which 39.4 percent by weight was 4,4'-isomer, 43.2 percent by weight was 2,4'-isomer, and 17.4 percent by weight was 2,2'-isomer.

Using essentially the same conditions as those described above and varying only the proportions of aniline and aniline hydrochloride two further runs were carried out. The proportions of reactants, reaction conditions and yield and composition of end-product in these runs is summarized in Table I below. The molar proportion given for aniline includes the aniline added as aniline hydrochloride in the last stage of the process. The yield and proportions of isomeric diamines were measured using G.L.P.C. as described above.

TABLE I

| Molar proportions of reactants | | | Reaction temp. (° C.) | Reaction time (min.) | Diamines, percent | Isomer distribution, percent | | |
|---|---|---|---|---|---|---|---|---|
| Aniline | Formaldehyde | HCl | | | | 2,2' | 2,4' | 4,4' |
| 4.125 | 1.0 | 0.125 | 190–192 | 5 | 64.3 | 16.7 | 43.1 | 40.2 |
| 6.180 | 1.0 | 0.180 | 190–192 | 5 | 73.0 | 17.7 | 41.0 | 41.3 |

EXAMPLE 2

A total of 8.2 g. (0.1 mole) of 36.6 percent aqueous formaldehyde solution was added slowing with stirring to 74.5 g. (0.8 mole) of aniline at such a rate as to maintain the temperature of the mixture at about 40° C. After the addition was complete, the resulting mixture was agitated for a further 2 hours at ambient temperatures (approximately 20° C.). The mixture so obtained was distilled at atmospheric pressure until no further water was collected in the distillate. The undistilled residue was heated rapidly to 150° C. with stirring and 3.11 g. (0.024 mole) of aniline hydrochloride was added in one batch. The temperature of the reaction rose rapidly to 155° C. and then subsided. The reaction mixture was maintained at 150° C. with stirring for 45 minutes and was then cooled rapidly to 20° C. and made alkaline by the addition of 3.8 g. (0.048 mole) of 50 percent aqueous sodium hydroxide solution. A small quantity of water was added to the reaction during this stage. The excess aniline was removed from the neutralized reaction mixture by steam distillation. The undistilled residue was extracted with three successive portions (each 100 ml.) of benzene. The benzene extracts were combined, washed with water, dried over anhydrous magnesium sulfate and filtered. The filtrate was distilled to remove benzene. There was thus obtained, as the undistilled residue, 16.5 g. of a mixture of methylene-bridged polyamines which was found by G.L.P.C. to contain 78.9 percent by weight of methylene dianilines of which 56.0 percent by weight was the 4,4'-isomer, 35.2 percent by weight was 2,4'-isomer and 8.8 percent by weight was 2,2'-isomer.

EXAMPLE 3

The procedure described in Example 2 was repeated exactly with the sole exception that the reaction product, obtained after removal of water from the aniline-formaldehyde condensate, was heated to 170° C. before addition of the aniline hydrochloride. The mixture of methylene bridged polyamines so obtained weighed 16.6 g. and was found by G.L.P.C. to contain 78.5 percent by weight of methylene dianilines of which 48.3 percent by weight was the 4,4'-isomer, 39.5 percent by weight was the 2,4'-isomer and 12.2 percent by weight was the 2,2'-isomer.

EXAMPLE 4

A total of 66 pounds of 37 percent aqueous formaldehyde was added slowly, with agitation, over a period of one hour to 450 pounds of aniline. The temperature rose from an initial value of 21° C. to a final value of 38° C. at the end of the addition. When the latter was complete the mixture was heated with stirring at 40° C. for 2 hours. The water present in the reaction mixture was allowed to separate and was decanted off the organic layer. The latter was then heated under reduced pressure to remove the last traces of water. The residual dry aminal mixture was charged to a continuous back mix reactor and heated to 180° C. With the reactor contents at this temperature gaseous hydrogen chloride was pumped into the reactor at a rate of 0.4 g. per minute. At the end of 10 minutes fresh dry aminal mixture (prepared as described above) was added to the reactor continuously at a rate of 50 ml per minute and reaction product was withdrawn from the reactor at the same rate. Throughout this period the flow of gaseous hydrogen chloride was maintained at 0.4 g. per minute. Subsequently the addition rate of fresh aminal was raised to 80 ml per minute and the gaseous hydrogen chloride rate to 0.9 g. per minute. Finally the fresh aminal addition rate was raised to 160 ml per minute and the gaseous hydrogen chloride rate to 1.6 g. per minute. Samples of reaction product removed at each of these three levels of aminal addition were analyzed for MDA-isomer content by G.L.P.C. and found to be as follows:

| Animal Addition Rate | Isomer Content (%) | | |
|---|---|---|---|
| | 2,2' | 2,4' | 4,4' |
| 50 ml/min | 14.1 | 42.1 | 43.8 |
| 80 ml/min | 14.8 | 43.1 | 42.1 |
| 160 ml/min | 14.4 | 42.8 | 42.8 |

A second run was carried out using the above procedure but increasing the amount of aniline employed from 450 pounds to 562 pounds and using a fresh aminal addition rate of 50 ml per minute and a gaseous hydrogen chloride addition rate of 0.4 g. per minute. The mixture of polyamines so obtained was found by G.L.P.C. to contain 63.3 percent methylene dianilines of which 12.3 percent by weight was 2,2'-isomer, 40.8 percent by weight was 2,4'-isomer and 46.9 percent by weight was 4,4'-isomer.

A solution of 1,655 g. of the latter mixture of polyamines in 3,000 ml of anhYdrous monochlorobenzene was added slowly with stirring and cooling at about 5° over a period of 1.5 hours to a solution of 2,500 g. of phosgene in 7,000 ml of monochlorobenzene. When the addition was complete the mixture was heated gradually to a temperature of 120° C. and maintained thereat (120° to 128° C.) for 6 hours while a stream of phosgene was passed through the reaction mixture. At the end of this time the excess phosgene was purged from the reaction mixture using a stream of nitrogen. The bulk of the monochlorobenzene was then removed using a long tube evaporator under reduced pressure at about 60° C. The residual monochlorobenzene was distilled away under vacuum at a maximum temperature of 150° C. There was thus obtained a mixture of polymethylene polyphenyl isocyanates having a methylenebis(phenyl isocyanate) content of 63 percent. This mixture was subjected to distillation at reduced pressure. A forecut of 11.4 g. was removed followed by a total of 333.6 g. of methylenebis(phenyl isocyanate) distilling at 155° C. at 0.5 mm of mercury. This diisocyanate was found to have an isocyanate equivalent of 125.2 and, by G.L.P.C., to have an isomer content as follows: 21.9 percent 2,2'-isomer; 49.0 percent 2,4'-isomer; and 29.1 percent 4,4'-isomer. The undistilled polymethylene polyphenyl polyisocyanate recovered from the above distillation was found by G.L.P.C to contain 32.3 percent methylenebis(phenyl isocyanate) of which 9.8 percent by weight was 2,2'-isomer, 40.1 percent was 2,4'-isomer and 50.1 percent by weight was 4,4'-isomer.

EXAMPLE 5

Using the phosgenation procedure described in the later portion of Example 4 above, the polyamine mixture containing 73 percent by weight of di(aminophenyl)methane, prepared as described in Example 1 above, was converted to the corresponding mixture of polymethylene polyphenyl polyisocyanates. The latter contained 73 percent by weight of methylenebis(phenyl isocyanates) of which 41 percent by weight was 4,4'-isomer, 41 percent by weight was 2,4'-isomer and 18 percent by weight was 2,2'-isomer.

Similarly, using the phosgenation procedure described in Example 4 above, the various polyamine mixtures prepared as described in Examples 1 to 3 above were converted to the corresponding polymethylene polyphenyl polyisocyanates having a content of methylenebis(phenyl isocyanate) and a ratio of isomers in the latter corresponding to the same content and isomer ratios of diamines in the starting polyamine mixture.

We claim:

1. In a process for the preparation of di(aminophenyl)methane in which the proportion of p,p'-isomer is from about 15 to about 85 percent by weight, the proportion of o,p'-isomer is from about 10 to about 60 percent by weight and the proportion of o,o'-isomer is from about 5 to about 25 percent by weight the steps of:

mixing aniline and formaldehyde in proportions such that the aniline is present in an amount corresponding to at least about 3.5 moles per mole of formaldehyde;
   removing the water of condensation liberated in the aniline-formaldehyde reaction product;
   heating the resulting anhydrous product to a temperature of about 125° C. to about 205° C.;
   and adding thereto under anhydrous conditions a catalytic amount of a proton source selected from the class consisting of hydrogen halides, alkanoic acids from one to 12 carbon atoms, inclusive, and the salts of said hydrogen halides and said alkanoic acids with aromatic amines.

2. The process of claim 1 wherein the proton source is hydrogen chloride.

3. The process of claim 1 wherein the proton source is an aromatic amine hydrochloride.

4. The process of claim 3 wherein the proton source is aniline hydrochloride.

5. The process of claim 1 wherein the anhydrous aniline-formaldehyde condensation product is heated at 185° to 190° C. during addition of the proton source.

6. In a process for the preparation of di(aminophenyl)methane wherein the p,p'-isomer content is from about 15 to about 85 percent by weight the o,p'-isomer content is from about 10 to about 60 percent by weight, and the o,o'-isomer content is from about 5 to about 25 percent by weight, based on total di(aminophenyl)-methane, the steps of: heating an anhydrous mixture of aniline and anilinoacetals, obtained by condensation of formaldehyde with excess aniline, to a temperature of about 125° C. to about 205° C. and adding thereto under anhydrous conditions a catalytic amount of a proton source selected from the class consisting of hydrogen halides and the salts thereof with aromatic amines.

7. The process of claim 6 wherein the proton source is hydrogen chloride.

8. The process of claim 6 wherein the proton source is an aromatic amine hydrochloride.

9. The process of claim 6 wherein the proton source is aniline hydrochloride.

10. The process of claim 6 where the reaction temperature is within the range of 185° to 190° C. during the addition of the proton source.

* * * * *